(12) United States Patent
Majumdar

(10) Patent No.: US 11,951,655 B2
(45) Date of Patent: Apr. 9, 2024

(54) SEPARATION OF MULTI-LAYERED MATERIAL TO FACILITATE RECYCLING

(71) Applicant: Shreya Majumdar, Lexington, MA (US)

(72) Inventor: Shreya Majumdar, Lexington, MA (US)

(73) Assignee: Shreya Majumdar, Lexington, MA (US)

( * ) Notice: Subject to any disclaimer, the term of this patent is extended or adjusted under 35 U.S.C. 154(b) by 0 days.

(21) Appl. No.: 17/877,911

(22) Filed: Jul. 30, 2022

(65) Prior Publication Data
US 2023/0129681 A1 Apr. 27, 2023

Related U.S. Application Data

(60) Provisional application No. 63/271,208, filed on Oct. 24, 2021.

(51) Int. Cl.
| | | |
|---|---|---|
| *B29B 17/02* | (2006.01) | |
| *B09B 3/30* | (2022.01) | |
| *B09B 101/75* | (2022.01) | |
| *B09B 101/85* | (2022.01) | |
| *B24D 11/00* | (2006.01) | |

(52) U.S. Cl.
CPC ............ *B29B 17/02* (2013.01); *B09B 3/30* (2022.01); *B09B 2101/75* (2022.01); *B09B 2101/85* (2022.01); *B24D 11/00* (2013.01); *B29B 2017/0217* (2013.01); *B29B 2017/0293* (2013.01)

(58) Field of Classification Search
CPC ............ B29B 17/02; B29B 2017/0432; B29B 2017/0217; B29B 2017/0293; B09B 3/30; B09B 2101/75; B09B 2101/85; B24D 11/00
See application file for complete search history.

(56) References Cited

U.S. PATENT DOCUMENTS 6,238,516 B1 * 5/2001 Watson .................. B29B 17/02
162/57

FOREIGN PATENT DOCUMENTS

EP 570600 A1 * 11/1993 ............... B24D 3/28

OTHER PUBLICATIONS

The Ways of Labeling Discs, Swift Publisher, https://www.swiftpublisher.com/useful-articles/the-ways-of-labeling-discs, accessed Jan. 20, 2023 (Year: 2020).*

* cited by examiner

*Primary Examiner* — S. Behrooz Ghorishi

(57) ABSTRACT

A method of separating constituent layers from a paper-plastic laminate material includes disposing a sheet of a paper-plastic laminate material on a first surface. The paper-plastic laminate material includes a paper layer on a first side and a plastic layer on a second side. The method also includes moving an abrasive second surface over the paper layer on the first side to contact the paper layer and separate portions of the paper layer from the plastic layer. The method further includes collecting the separated portions of the paper layer and providing the separated portions of the paper layer as input to a paper recycling process, and collecting the plastic layer and providing the plastic layer as input to a plastic recycling process. The method may help increase recycling rates of paper and plastic, reduce raw material harvesting, reduce pollution and habitat destruction, and improve the quality of recycled material.

8 Claims, 4 Drawing Sheets

SEPARATION OF MULTI-LAYERED MATERIAL TO FACILITATE RECYCLING

PRIORITY

This application claims priority to U.S. Provisional Application 63/271,208, filed on Oct. 24, 2021, the entire content of which is incorporated herein by reference.

TECHNICAL FIELD

This disclosure relates to separation of multi-layered material into constituent components.

BACKGROUND

Multi-layered materials are used in various applications. For example, multi-layered materials such as paper-plastic laminates are widely used in disposable cups, plates etc. Such paper-plastic laminates are materials composed of tightly bound layers of paper and plastic. This layered structure can make the material incompatible with some recycling systems that rely on processing paper and plastic separately.

SUMMARY

In one aspect, this document presents a method that includes disposing a sheet of a paper-plastic laminate material on a first surface. The paper-plastic laminate material includes a paper layer on a first side and a plastic layer on a second side. The method also includes moving an abrasive second surface over the paper layer on the first side to contact the paper layer and separate portions of the paper layer from the plastic layer. The method further includes collecting the separated portions of the paper layer and providing the separated portions of the paper layer as input to a paper recycling process, and collecting the plastic layer and providing the plastic layer as input to a plastic recycling process.

In another aspect, this document features an apparatus that includes a cleaning plate including a first surface configured to receive a sheet of a paper-plastic laminate material having a paper layer on a first side and a plastic layer on a second side. The apparatus also includes an abrasive element disposed above the cleaning surface such that a surface of the abrasive element is configured to contact the paper-plastic laminate material received on the cleaning plate. The apparatus further includes a motor configured to move the abrasive element over the paper-plastic laminate material received on the cleaning plate, and a receptacle disposed beneath the cleaning surface. The receptacle is configured to collect material separated from the paper-plastic laminate.

In another aspect, this document features a method that includes disposing a sheet of a multi-layer material on a first surface, the multi-layer material including a first layer on a first side and a second layer on a second, opposing side. The method also includes moving an abrasive second surface over the first layer on the first side to separate portions of the first layer from the second layer. The method further includes collecting the separated portions of the first layer and providing the separated portions of the first layer as input to a recycling process configured to process material of the first layer. The method also includes collecting the second layer and providing the second layer as input to a recycling process configured to process material of the second layer.

Each of the above aspects can include one or more of the following features.

The paper-plastic laminate material can be pre-processed with a liquid configured to soften the paper layer for separation from the plastic layer. For another multi-layer material, the multi-layer material may be pre-processed with a liquid configured to soften the first layer for separation from the second layer. The liquid can be water, or include at least one of: an acid, a base, or a solution that is formulated to deform or break down the rigid structure of the cellulose in the paper layer (or the first layer in a general multi-layer material with a first layer and a second layer). Collecting the plastic layer (or the second layer in general) can include removing the plastic layer from the first surface. The abrasive second surface can include multiple small plastic ringlets or other protrusions made of plastic that selectively scrape off the paper layer from the plastic-paper laminate material while preserving the plastic layer for recycling. In general, the abrasive second surface can be selected such that the abrasive second surface selectively scrapes off the first layer from the multi-layer material while preserving the second layer in a recyclable form.

The cleaning plate can be configured to move between the abrasive element and the receptacle. The receptacle can be configured to hold a liquid that softens a paper layer of the paper-plastic laminate material for ease of removal. A liquid dispenser can be configured to hold the liquid that softens a paper layer of the paper-plastic laminate material.

Various implementations described herein may provide one or more of the following advantages. By effectively and efficiently separating the paper and plastic components of paper-plastic laminate materials, the technology presented herein provides a new environment-friendly disposal option that can reduce environmental harm due to plastic pollution while conserving landfill space. The technology can also potentially increase recycling rates and decrease the rate at which raw materials are harvested, thereby reducing habitat loss and deforestation and helping preserve ecosystems.

Figure 1:
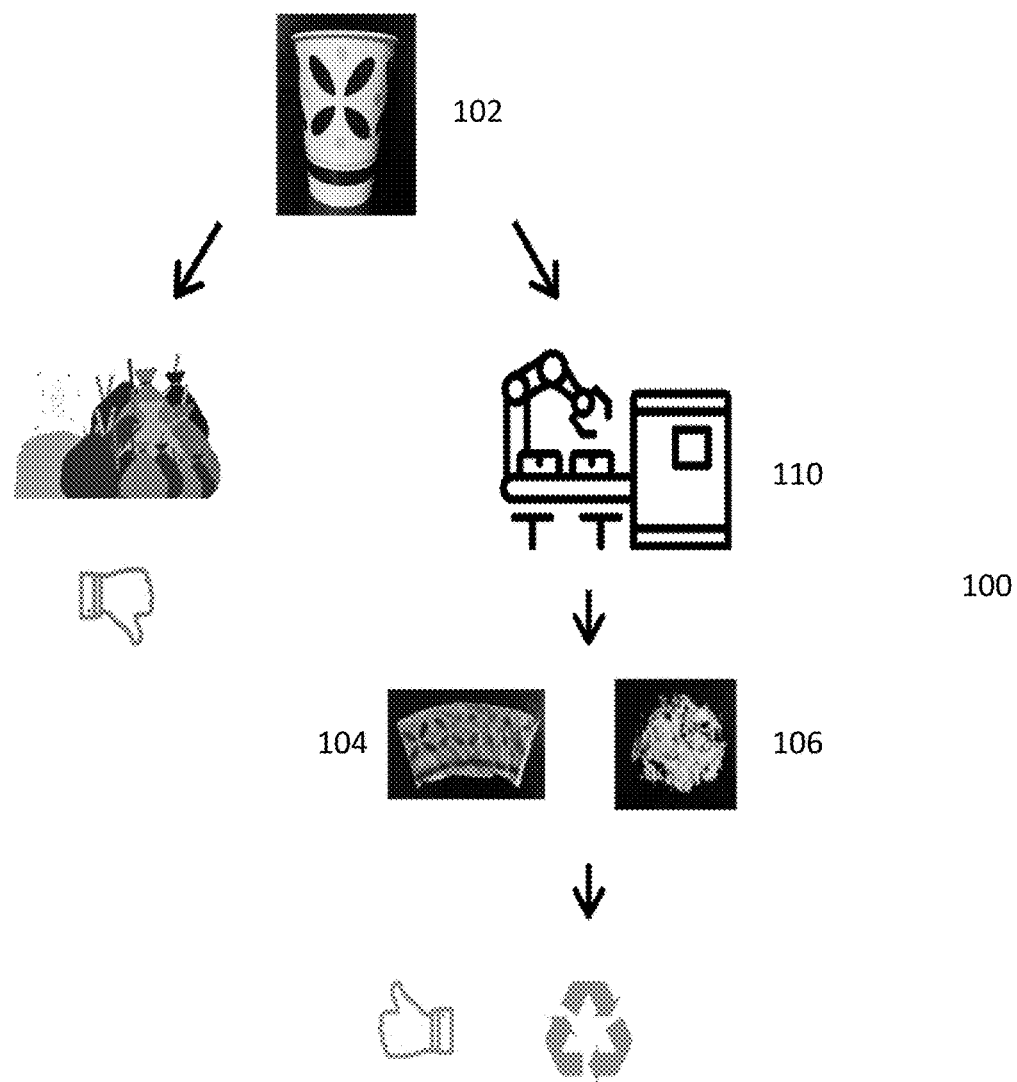
FIG. 1 is a schematic diagram illustrating an example process flow associated with the technology described herein.

Repeat use of reference characters in the present specification and drawings is intended to represent same or analogous features or elements.

DETAILED DESCRIPTION

Methods exist to dispose of certain paper-plastic laminate products, such as paper cups, in a more environment-friendly manner. But existing methods rely on shredding the material into small pieces, resulting in a set of small paper and plastic pieces. For sustainable waste management practices such as recycling, the shredding process limits what these materials can be remade into. In particular, the shredding process breaks down the polymer chains within the paper and plastic. Long polymer chains within paper and plastic contribute to high quality material that can be used in a variety of products, while shortened polymer chains contribute to low quality material that can only be used to make lower grade products. A key part of making sustainable management more effective is improving the quality and uses of recycled material.

This document describes technology by which certain multi-layered material (e.g., a paper-plastic laminate material) can be recycled or disposed of in an environment-friendly manner. The paper-plastic laminate is a material composed of tightly bound layers of paper and plastic. This layered structure can make the material incompatible with some recycling systems that rely on processing paper and plastic separately. The technology described herein presents a cost-effective way of separating the paper and plastic components of the paper-plastic laminate material such that each component is in a suitable form to be recycled or disposed of in an environment-friendly manner. Additionally, the technology provides an opportunity to recycle the components into high quality material, helping make recycling a more viable waste management option. In some implementations of the process, the paper-plastic laminate material is peeled open by separating the plastic layers within paper-plastic laminate material to yield two sheets with plastic on one side and paper on the other. Next, the sheet is prepared for separation of paper and plastic by applying a solution that softens and loosens the paper from the plastic, allowing for a seamless removal via a mild abrasion. In some implementations, an abrasive is rubbed against the paper layer to scrape off the loosened paper from the paper-plastic laminate material, thereby separating the material into a sheet of plastic and residual paper sludge.

Composite multi-layered materials such as paper-plastic laminate materials are widely used as they can be lightweight, cheap, and durable. Such materials are found in numerous products, ranging from paper cups to packaging material. Widespread use of the material correspondingly results in large amounts of waste that may be challenging to process. Because such composite materials can be incompatible with some recycling systems (e.g., systems that are incapable of processing paper and plastic if they are attached to one another), products using such composite materials often end up in landfills. In landfills, these materials can in turn pose multiple problems. For example, the plastic in the material can have long life spans (in the range of about 500 years), and may end up in different habitats as a contaminant where they can potentially disrupt ecosystems and threaten different species. Additionally, the large amounts of waste can rapidly take up space in landfills. By effectively and efficiently separating the paper and plastic components of paper-plastic laminate materials, the technology presented herein provides a new environment-friendly disposal option that can potentially reduce environmental harm due to plastic pollution while conserving landfill space. The technology can also potentially increase recycling rates and decrease the rate at which raw materials are harvested, thereby reducing habitat loss and deforestation, and helping preserve ecosystems.

FIG. 1 is a schematic diagram illustrating an example process flow associated with the technology described herein. Specifically, the example process flow 100 of FIG. 1 illustrates how a multi-layered material such as paper-plastic laminate material 102 can be processed such that such material does not end up in landfills. When such materials are put in landfills, the presence of plastic prolongs the lifespan of the materials and takes up a significant amount of space in the landfills. Moreover, due to natural processes such as wind, the plastic can find its way into environments where it disrupts and contaminates ecosystems. The technology described herein espouses processing paper-plastic laminate materials 102 via an apparatus 110 such that the material 102 is broken down into constituent materials—e.g., a paper component 104 and a plastic component 106. Individually, the paper component 104 and the plastic component 106 are typically compatible with most recycling systems, allowing the constituent materials to be recycled rather than be put in landfills. In addition, the paper component 104 and the plastic component 106 are processed in a manner such that they may potentially be recycled into higher quality material than the quality usually produced in most recycling systems.

Figure 2:
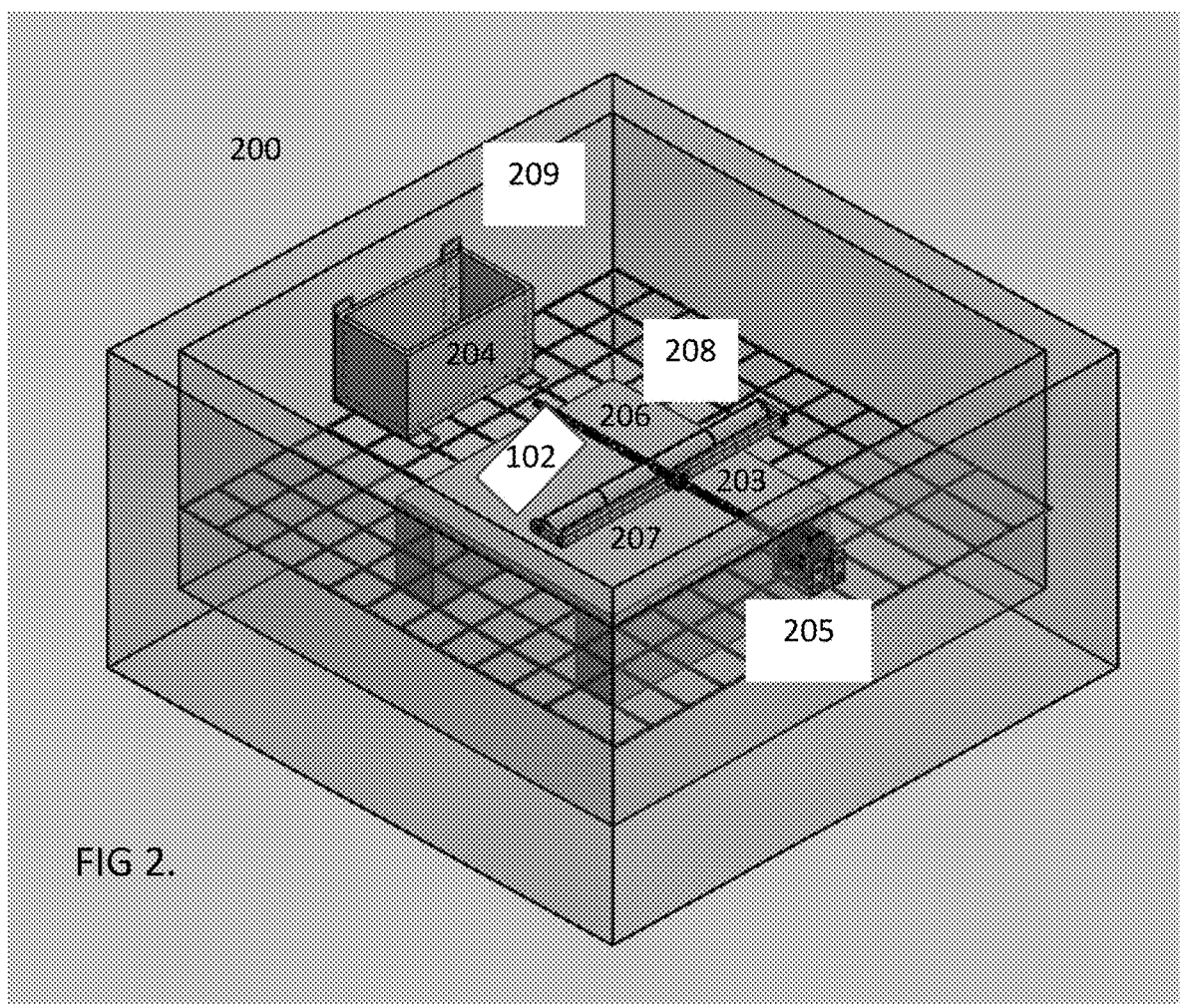
FIG. 2 is a schematic diagram of a first example apparatus that separates constituent materials from multi-layered materials in accordance with technology described herein.

FIG. 2 is a schematic diagram of a first example apparatus 200 that separates constituent materials from multi-layered materials in accordance with technology described herein. Specifically, the apparatus in FIG. 2 is described in conjunction with the example of a paper-plastic laminate material which is separated into constituent paper and plastic.

Specifically, the apparatus 200 includes a cleaning plate 207 on which the paper-plastic laminate material is disposed for processing. The paper side of the paper-plastic laminate material is disposed facing upwards. An abrasive element 203 is configured to contact the paper side of the paper-plastic laminate material 102. The abrasive element 203 is configured to be moved over the surface of the paper side of the paper-plastic laminate material such that the abrasive element scrapes off the paper from the plastic layer. In some implementations, scraping surface of the abrasive element (also referred to as an abrasive surface) can include multiple ringlets or other protrusions. The material of the abrasive surface can be selected such that it can scrape off paper from the paper-plastic laminate, but leave the plastic in a recyclable form. For example, the material of the abrasive surface can be a semi-rigid plastic such as, polyethylene, polypropylene, or Acrylonitrile-Butadiene-Styrene. For extending the disclosed technology to other multi-layer material, the abrasive surface of the abrasive element 203 can be selected such that the material can scrape off one of the layers while leaving one or more other layers of the composite layer material in a recyclable form. In some implementations, the abrasive surface of the abrasive element 203 can include metallic parts such as steel wool or mesh.

In some implementations, a motor 205 is used to turn a lead screw 206 to move the abrasive element 203 along lead screw 206. As the abrasive element 203 is moved along the lead screw, it rubs against the paper side of the paper-plastic laminate material 102, thereby removing paper from the paper-plastic laminate material 102. The abrasive element 203 can also be configured to push the paper off the cleaning plate 207 such that the runoff paper is caught in a filter material 208 below the cleaning plate 207. After separation of the paper and plastic is completed, the plastic side of the paper-plastic laminate material 102 remains on cleaning plate 207, while the scraped off paper is caught in the filter material 208.

The filter material 208 is used to drain any liquid that may be used in any preprocessing step to facilitate easier separation of paper and plastic from the paper-plastic laminate materials. Such pre-processing may be done, for example, manually or separately using another machine. In some implementations, the preprocessing may be done within the apparatus 200. For example, a tank 204 may be attached to a wall 209 of the apparatus. The tank 204 can be configured to hold a liquid that facilitates softening and loosening of the paper in the paper-plastic laminate material 102 such that the paper may be scraped off easily by the abrasive element 203. In some implementations, the liquid can be water, an acid, a base, or another solution that can deform or break down the rigid structure of the cellulose within the paper. In some implementations, the solution or liquid can be selected based on the individual layers of the multi-layer material. For example, for a given multi-layer material, the solution can be selected such that it selectively softens one of the layers of the multi-layer material to make that layer conducive to scraping, while leaving one or more other layers of the multi-layer material in recyclable form. In some implementations, the disposal of the liquid from the tank 204 can be regulated using manual or electronic processes, possibly in conjunction with the use of tubes or a sprinkler.

Figure 3:
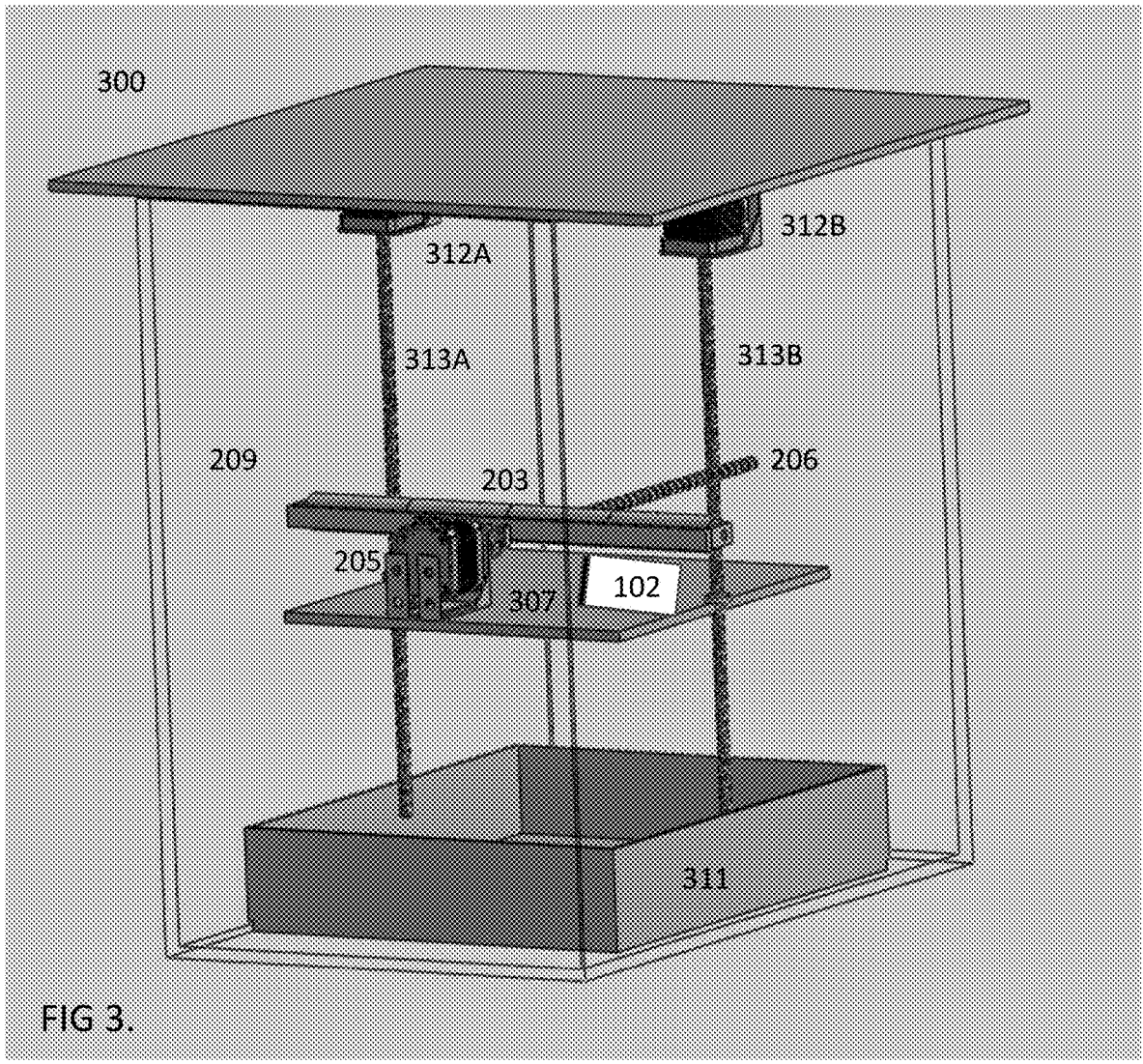
FIG. 3 is a schematic diagram of a second example apparatus that separates constituent materials from multi-layered materials in accordance with technology described herein.

FIG. 3 is a schematic diagram of a second example apparatus 300 that separates constituent materials from multi-layered materials in accordance with technology described herein. In the apparatus 300, the abrasive element 203 is configured to contact and move over the paper side of the paper-plastic laminate material 102. Similar to the example apparatus 200, the abrasive element can be moved over the paper side of the paper-plastic laminate material 102 using a motor 205 that turns the lead screw 206 to move the abrasive element 203 along the lead screw 206. The cleaning plate 307 of the apparatus 300—on which the paper-plastic laminate material 102 is disposed with the paper side facing upwards—can be configured to be moved in a vertical direction such that the cleaning plate 307 may be moved between the abrasive element 203 and a tank 311. The tank 311 can be configured to hold a solution that facilitates easy softening and loosening of paper from the paper-plastic laminate material 102. The apparatus 300 also includes one or more motors 312a and 312b (312 in general) that are configured to turn lead screws 313a and 313b (313, in general) coupled to the cleaning plate 307 to move the cleaning plate up or down between the abrasive element 203 and the tank 311. Such a configuration allows the cleaning plate 307 to carry the paper-plastic laminate material 102 down to tank 311 for preprocessing and then up to the abrasive element 203. Once the paper-plastic laminate material 102 is in contact with the abrasive element 203, the motor 205 can be run to turn the lead screw 206 to cause the abrasive element 203 to rub against the paper side of the paper-plastic laminate material 102 disposed on the cleaning plate 307. Similar to the example apparatus 200, the rubbing process removes paper from paper-plastic laminate material 102 and pushes the paper off the cleaning plate 307. The runoff paper is collected in the tank 311. In some implementations, after a round of scraping the cleaning plate 307 may be lowered in the tank 311 to reapply the solution, and then raised to contact with the abrasive element 203 for another round of scraping. Once the separation of the paper and plastic is completed, the plastic side of the paper-plastic laminate material 102 remains on cleaning plate 307, while the paper is collected in the tank 311.

Figure 4:
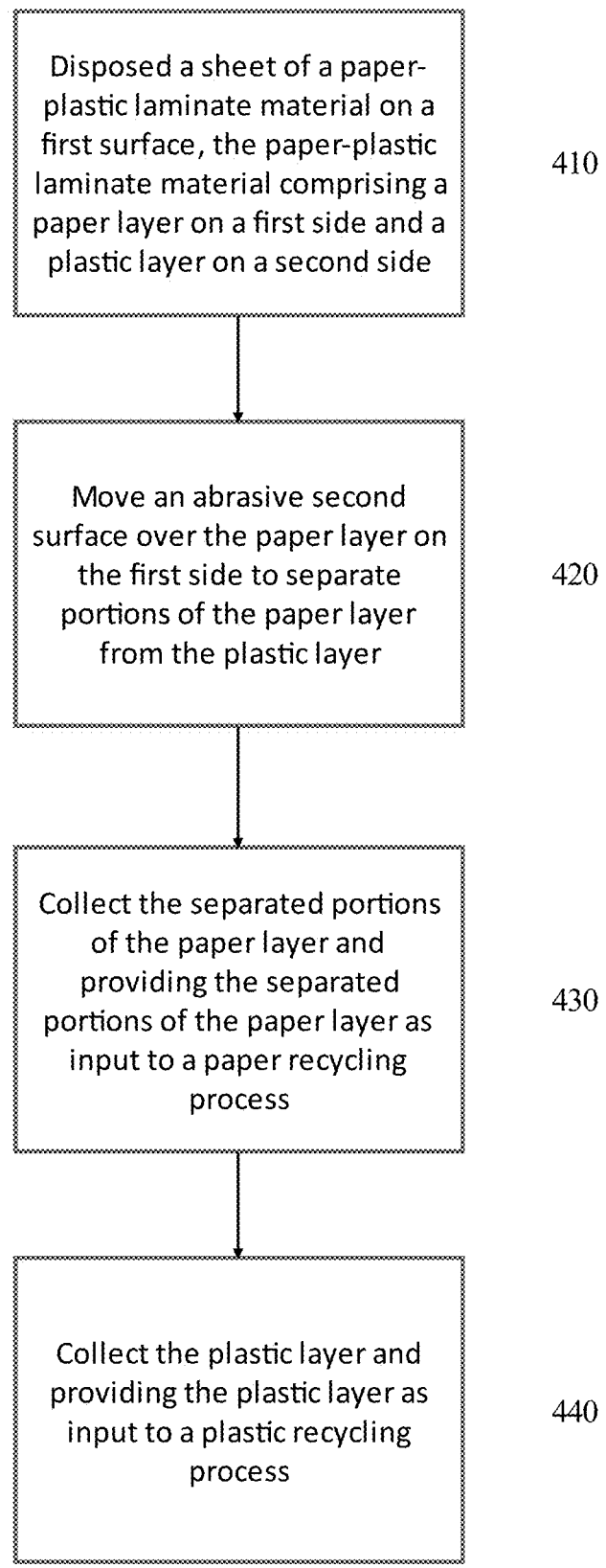
FIG. 4 is a flowchart of an example process for separating constituent materials from multi-layered materials.

FIG. 4 is a flowchart of an example process 400 for separating constituent materials from multi-layered materials. Specifically, FIG. 4 illustrates the process 400 with the example of a paper-plastic material. However, the process 400 can be adapted for other multi-layered materials without deviating from the scope of the disclosure. In some implementations, the steps of the process 400 can be executed, at least in part within the apparatus 200 or the apparatus 300 described above.

Operations of the process 400 includes disposing a sheet of a paper-plastic laminate material on a first surface (410). The paper-plastic laminate material can include a paper layer on a first side and a plastic layer on a second, opposing side. In some implementations, the paper-plastic laminate material is pre-processed with a liquid to soften the paper layer for separation from the plastic layer. The liquid can include at least one of: water, an acid, a base, or another solution that can deform or break down the structure of the cellulose in the paper. In some implementations, the liquid can be or include at least one of: water, an acid, a base, or a solution that is formulated to deform or break down one of the layers (e.g., paper) such that the layer is scraped off by the abrasive second surface. The liquid can be selected based on properties that would selectively break down one of the layers for removal by the abrasive element while having significantly less impact on the other one or more layers (e.g., plastic).

Operations of the process 400 also includes moving an abrasive second surface over the paper layer on the first side to separate portions of the paper layer from the plastic layer (420). In some implementations, the abrasive second surface can include multiple small ringlets or other protrusions made of plastic that selectively scrape off the paper layer from the plastic-paper laminate material while preserving the plastic layer for recycling. The abrasive second surface can be selected such that the abrasive second surface selectively scrapes off the first layer from the multi-layer material while preserving the second layer in a recyclable form. For example, in the case of the paper-plastic laminate, the abrasive surface can include ringlets or protrusions made of semi-rigid plastic that would scrape off the pre-processed paper layer, while preserving the plastic layer in a suitable form for recycling.

Operations of the process 400 also include collecting the separated portions of the paper layer and providing the separated portions of the paper layer as input to a paper recycling process (430). In general, for multi-layer materials with at least a first layer and a second layer, the separated portions of the first layer are collected and provided as input to a recycling process configured to process material of the first layer.

Operations of the process 400 also include collecting the plastic layer and providing the plastic layer as input to a plastic recycling process (440). In general, for multi-layer materials with at least a first layer and a second layer, the residual second layer is collected after scraping off the first layer and provided as input to a recycling process configured to process material of the second layer.

Although a few implementations have been described in detail above, other modifications may be made without departing from the scope of the inventive concepts described herein, and, accordingly, other implementations are within the scope of the following claims.

What is claimed is:

1. A method comprising:
   peeling a paper-plastic laminate material comprising a first plastic layer, a second plastic layer, and a paper layer disposed between the first plastic layer and the second plastic layer, to obtain a dual-layer sheet, the dual-layer sheet comprising the paper layer on a first side and one of the first plastic layer or the second plastic layer on a second side,
   disposing the dual-layer sheet on a first substantially flat surface such that the first plastic layer or the second plastic layer contacts the substantially flat surface, and the dual-layer sheet is held substantially stationary with respect to the substantially flat surface;

moving an abrasive second surface with respect to the substantially flat surface, the abrasive second surface configured to contact the paper layer and separate portions of the paper layer from the first or second plastic layer, wherein the abrasive second surface comprises multiple small ringlets configured to scrape off the paper layer from the dual-layer sheet while preserving the first or second plastic layer;

collecting the separated portions of the paper layer and providing the separated portions of the paper layer as input to a paper recycling process; and collecting the first or second plastic layer and providing the first or second plastic layer as input to a plastic recycling process.

2. The method of claim 1, further comprising pre-processing the dual-layer sheet with a liquid configured to soften the paper layer for separation from the second plastic layer.

3. The method of claim 2, wherein the liquid is water.

4. The method of claim 2, wherein the liquid comprises at least one of: an acid, a base, or a solution that is formulated to deform or break down cellulose in the paper layer.

5. The method of claim 1, wherein collecting the first or second plastic layer comprises removing the first or second plastic layer from the first substantially flat surface.

6. A method comprising:

peeling a multi-layer laminate material comprising a first layer, a second layer, and a third layer disposed between the first layer and the second layer, to obtain a dual-layer sheet, the dual-layer sheet comprising the third layer on a first side and one of the first layer or the second layer on a second side;

disposing the dual-layer sheet on a first substantially flat surface such that the first layer or the second layer contacts the substantially flat surface, and the dual-layer sheet is held substantially stationary with respect to the substantially flat surface;

moving an abrasive second surface with respect to the substantially flat surface, the abrasive second surface configured to separate portions of the third layer from the first or second layer, wherein the abrasive second surface comprises multiple small ringlets configured to scrape off the third layer from the dual-layer sheet while preserving the first or second layer;

collecting the separated portions of the third layer and providing the separated portions of the third layer as input to a first recycling process configured to process material of the third layer; and collecting the first or second layer and providing the first or second layer as input to a second recycling process configured to process material of the second layer.

7. The method of claim 6, further comprising pre-processing the dual-layer sheet with a liquid configured to soften the third layer for separation from the second layer.

8. The method of claim 6, wherein the liquid comprises at least one of: water, an acid, a base, or a solution that is formulated to deform or break down the third layer such that the third layer is scraped off by the abrasive second surface.

\* \* \* \* \*